(12) United States Patent
Kagawa et al.

(10) Patent No.: US 8,936,837 B2
(45) Date of Patent: Jan. 20, 2015

(54) ANTI-GLARE FILM MANUFACTURING METHOD

(75) Inventors: Hideaki Kagawa, Kanagawa (JP); Takahiro Nakazawa, Kanagawa (JP); Kazuhiro Oki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/411,064

(22) Filed: Mar. 2, 2012

(65) Prior Publication Data

US 2012/0225214 A1 Sep. 6, 2012

(30) Foreign Application Priority Data

Mar. 4, 2011 (JP) ................................. 2011-047799

(51) Int. Cl.

| | |
|---|---|
| C08F 2/48 | (2006.01) |
| G02B 27/00 | (2006.01) |
| G02B 13/20 | (2006.01) |
| G02B 5/02 | (2006.01) |
| B05D 3/06 | (2006.01) |
| B05D 5/02 | (2006.01) |
| B05D 3/02 | (2006.01) |

(52) U.S. Cl.
CPC .............. *G02B 5/0226* (2013.01); *B05D 3/067* (2013.01); *B05D 5/02* (2013.01); *B05D 3/0209* (2013.01)
USPC ............................. 427/508; 359/601; 359/599

(58) Field of Classification Search
CPC ........ B05D 3/0209; B05D 3/067; B05D 5/02; G02B 5/0226
USPC .......................................... 427/508; 204/159
See application file for complete search history.

(56) References Cited

U.S. PATENT DOCUMENTS

| | | | |
|---|---|---|---|
| 6,797,210 B2* | 9/2004 | Iijima | 264/112 |
| 2006/0114305 A1* | 6/2006 | Ohtsu et al. | 347/102 |
| 2008/0218865 A1* | 9/2008 | Iwata et al. | 359/601 |

FOREIGN PATENT DOCUMENTS

| | | |
|---|---|---|
| JP | 11-104562 A | 4/1999 |
| JP | 11-268240 A | 10/1999 |
| JP | 11-305010 A | 11/1999 |
| JP | 2010-244018 A | 10/2010 |
| WO | WO 2006/088203 A1 | 8/2006 |

OTHER PUBLICATIONS

Japanese Office Action issued in Japanese Application No. 2011-047799 on Jan. 8, 2013.

* cited by examiner

*Primary Examiner* — Dah-Wei D Yuan
*Assistant Examiner* — Kristen A Dagenais
(74) *Attorney, Agent, or Firm* — Birch, Stewart, Kolasch & Birch, LLP (57) ABSTRACT

The method includes: forming a coating film including particles and an ultraviolet curable resin on a film substrate; and curing the ultraviolet curable resin by ultraviolet irradiation to form an anti-glare layer constituted by the particles and the ultraviolet curable resin. A ratio of a thickness A of the anti-glare layer to a diameter B of the particles is in the range of 1.5 to 2.4. The ultraviolet irradiation is performed with two or more ultraviolet irradiation units, the first unit irradiation amount is 49 mJ/cm$^2$ or less, the second and subsequent units irradiation amount is greater than 50 mJ/cm$^2$, and the total irradiation amount is 100 mJ/cm$^2$ or greater. The oxygen concentration at a position which is 1 mm above a surface of the coating film is 1 ppm to 2000 ppm. The first unit irradiation is performed above a roller with surface temperature of 10° C. to 24° C.

12 Claims, 5 Drawing Sheets

FIG. 3A (TABLE 1)

| | SURFACE TEMPERATURE OF BACKUP ROLLER OF FIRST LAMP [°C] | IRRADIATION AMOUNT OF FIRST LAMP [mJ/cm²] | IRRADIATION AMOUNT OF SECOND LAMP [mJ/cm²] | OXYGEN CONCENTRATION [ppm] |
|---|---|---|---|---|
| COMPARATIVE EXAMPLE 1 | 10 | 100 | / | 300 |
| EXAMPLE 1 | 10 | 35 | 115 | 300 |
| EXAMPLE 2 | 18 | 35 | 115 | 300 |
| EXAMPLE 3 | 24 | 35 | 115 | 300 |
| COMPARATIVE EXAMPLE 2 | 26 | 35 | 115 | 300 |
| COMPARATIVE EXAMPLE 3 | 40 | 35 | 115 | 300 |
| COMPARATIVE EXAMPLE 4 | 60 | 35 | 115 | 300 |
| EXAMPLE 4 | 24 | 35 | 115 | 500 |
| EXAMPLE 5 | 24 | 35 | 115 | 1500 |
| EXAMPLE 6 | 24 | 49 | 115 | 500 |
| COMPARATIVE EXAMPLE 5 | 24 | 35 | 115 | 3000 |
| COMPARATIVE EXAMPLE 6 | 24 | 60 | 90 | 300 |
| COMPARATIVE EXAMPLE 7 | 24 | 90 | 60 | 300 |
| COMPARATIVE EXAMPLE 8 | 24 | 35 | 45 | 300 |

FIG. 3B (TABLE 1)

| | SURFACE ROUGHNESS Ra [μm] | ROUGHNESS OF SURFACE [VISUAL CHECK] | PENCIL HARDNESS SURFACE HARDNESS | CROSS CUT ADHESION |
|---|---|---|---|---|
| COMPARATIVE EXAMPLE 1 | 0.110 | C | B | B |
| EXAMPLE 1 | 0.103 | A | B | B |
| EXAMPLE 2 | 0.102 | A | A | A |
| EXAMPLE 3 | 0.104 | A | A | A |
| COMPARATIVE EXAMPLE 2 | 0.110 | C | A | A |
| COMPARATIVE EXAMPLE 3 | 0.117 | C | A | A |
| COMPARATIVE EXAMPLE 4 | 0.136 | D | A | A |
| EXAMPLE 4 | 0.104 | A | A | B |
| EXAMPLE 5 | 0.097 | A | B | B |
| EXAMPLE 6 | 0.105 | A | A | A |
| COMPARATIVE EXAMPLE 5 | 0.092 | A | C | C |
| COMPARATIVE EXAMPLE 6 | 0.123 | C | A | A |
| COMPARATIVE EXAMPLE 7 | 0.126 | C | A | A |
| COMPARATIVE EXAMPLE 8 | 0.099 | A | B | C |

FIG. 4

(TABLE 2)

| | FILM PRESSURE A OF ANTI-GLARE LAYER | DIAMETER B OF PARTICLES | A/B | ANTI-GLARE LAYER | PENCIL HARDNESS |
|---|---|---|---|---|---|
| COMPARATIVE EXAMPLE 8 | 8 | 5 | 1.60 | A | C |
| COMPARATIVE EXAMPLE 9 | 9 | 5 | 1.80 | A | C |
| EXAMPLE 7 | 10 | 5 | 2.00 | A | B |
| EXAMPLE 8 | 11 | 5 | 2.20 | A | A |
| COMPARATIVE EXAMPLE 10 | 11 | 4 | 2.75 | C | A |
| EXAMPLE 9 | 11 | 6 | 1.83 | A | A |
| COMPARATIVE EXAMPLE 11 | 11 | 8 | 1.38 | C | A |
| COMPARATIVE EXAMPLE 12 | 11 | 9 | 1.22 | C | A |
| EXAMPLE 10 | 12 | 8 | 1.50 | A | A |
| EXAMPLE 11 | 14 | 8 | 1.75 | A | A |
| EXAMPLE 12 | 14 | 9 | 1.56 | B | A |
| COMPARATIVE EXAMPLE 13 | 14 | 10 | 1.40 | C | A |

ANTI-GLARE FILM MANUFACTURING METHOD

BACKGROUND OF THE INVENTION

1. Field of the Invention

The present invention relates to an anti-glare film manufacturing method, and particularly, to an anti-glare film manufacturing method which includes: forming an ultraviolet curable resin including particles on a film substrate; and curing the ultraviolet curable resin by ultraviolet irradiation to form an anti-glare layer.

2. Description of the Related Art

In recent years, there is increasing demand for optical films. Representative examples of the optical film include films having various functions such as an optical compensation film which is used as a retardation film for a liquid crystal cell, an anti-reflective film, and an anti-glare film.

As a representative optical film manufacturing method, there is a method which includes: applying a coating liquid to a surface of a strip-like flexible support (hereinafter, referred to as "web") by using various coating devices; drying the coating liquid; and curing the coating liquid to form a coating film having various compositions. In many cases, an ultraviolet (UV) curing unit is employed in the curing.

The curing efficiency in the UV curing process is important. Particularly, it is known that when oxygen is present, the oxygen becomes an inhibitory factor in the course of the polymerization and crosslinking, whereby the strength of the coating film and the bonding property between the coating film and the web which is a base substrate are reduced, and furthermore, the hardness, adhesion force and the like of the coating film are reduced.

Generally, the coating film is formed by polymerizing using UV light a low-molecular resin, which is referred to as a monomer, to be a high-molecular resin, but in many cases, the oxygen concentration is lowered under the UV irradiation. The reason for this is that under the UV irradiation, a radical that is generated from the initiator plays a major roll in the resin polymerization, but when oxygen is present, the radical is eliminated. Accordingly, it is important to lower the oxygen concentration.

Hitherto, there are various proposals as methods and devices for coping with the presence of oxygen (see JP1999-104562A (JP-H11-104562A)).

This proposal employs a configuration in which an UV-irradiated portion is filled with an inert gas to remove the oxygen. Specifically, the entire irradiated portion is covered with a metallic member or the like and an inert gas is introduced therein. Therefore, the oxygen concentration in the UV-irradiated portion can be kept to 1000 ppm or lower.

In addition, there is a proposal to obtain a uniform surface hardness only with a small unevenness in curing while reducing the inert gas consumption (see JP1999-268240A (JP-H11-268240A)). This proposal employs a configuration in which an ultraviolet irradiator and a reaction chamber are isolated from each other and a sealing mechanism is provided at a reaction chamber entrance in order to lower the oxygen concentration in the reaction chamber.

SUMMARY OF THE INVENTION

An anti-glare film uses an anti-glare function of causing the light to be scattered (surface scattering property) by forming irregularities on a surface of an anti-glare layer by adding translucent particles to the anti-glare layer, and a light scattering function (internal scattering property) which is generated from a difference in index of refraction between the translucent particles and the translucent resin in the anti-glare layer.

However, the anti-glare layer has a disadvantage in that the surface of the anti-glare layer roughens at random times because the particles are easy to aggregate. The surface roughness can be visually confirmed as roughness. Particularly, since the anti-glare film causes the light reflected on a screen to be scattered and thereby improves the visibility, it is adhered to the surface of a display in many cases. Accordingly, it is preferable that the visual roughness of the anti-glare layer cannot be confirmed, and it is necessary to deal with a portion which roughens at random times. Therefore, there is a problem in that the productivity (yield ratio) is reduced.

The present invention has been made in view of the above-mentioned problems and an object of the present invention is to provide an anti-glare film manufacturing method which can prevent the visual roughness of an anti-glare layer and improve productivity.

According to an aspect of the present invention, there is provided an anti-glare film manufacturing method including: forming a coating film including particles and an ultraviolet curable resin on a film substrate; and curing the ultraviolet curable resin by ultraviolet irradiation to form an anti-glare layer constituted by the particles and the ultraviolet curable resin. A ratio A/B of a thickness A of the anti-glare layer to a diameter B of the particles is in the range of 1.5 to 2.4. The ultraviolet irradiation is performed in a divided manner with two or more ultraviolet irradiation units, the ultraviolet irradiation amount in the ultraviolet irradiation of the first unit is 49 mJ/cm$^2$ or less, the ultraviolet irradiation amount in the ultraviolet irradiation of the second and subsequent units is greater than 50 mJ/cm$^2$, and the total ultraviolet irradiation amount in the whole ultraviolet irradiation is 100 mJ/cm$^2$ or greater. The oxygen concentration at a position which is 1 mm above a surface of the coating film in the ultraviolet irradiation is 1 ppm to 2000 ppm. The ultraviolet irradiation of the first unit is performed above a roller having a surface temperature of 10° C. to 24° C.

The inventor of the present invention has found that the anti-glare layer of the anti-glare film is formed of an ultraviolet curable resin including particles and a surface of the anti-glare layer roughens at random times due to the instability in aggregation of the particles. In addition, the inventor of the present invention has obtained the knowledge that the curing condition in the ultraviolet irradiation is important in order to prevent the visual roughness of the anti-glare layer.

In addition, the inventor of the present invention has obtained the knowledge that it is desirable that the ultraviolet irradiation be performed in a divided manner with two or more ultraviolet irradiation units, the ultraviolet irradiation amount in the ultraviolet irradiation of the first unit be 49 mJ/cm$^2$ or less, the ultraviolet irradiation amount in the ultraviolet irradiation of the second and subsequent units be greater than 50 mJ/cm$^2$, and the total ultraviolet irradiation amount in the whole ultraviolet irradiation be 100 mJ/cm$^2$ or greater.

The inventor of the present invention also has obtained the knowledge that the temperature condition in the ultraviolet irradiation of the first unit in which the curing of the ultraviolet curable resin starts is also important, and it is desirable that the ultraviolet irradiation of the first unit be performed above a roller having a surface temperature of 10° C. to 24° C. When the temperature is higher than 24° C., the viscosity of the ultraviolet curable resin is excessively reduced, and thus the particles flow easily and the particles are strongly aggregated, whereby the surface of the anti-glare layer roughens. On the other hand, when the temperature is lower than 10° C., it is difficult for the curing of the ultraviolet curable resin to proceed, and thus the particles are aggregated. Here, "above a roller" is a side which is separated from a backup roll on which the web is wound toward the ultraviolet irradiation side.

Furthermore, in the ultraviolet irradiation, it is also necessary to adjust the oxygen concentration at a position which is 1 mm above a surface of the coating film to 1 ppm to 2000 ppm. When the oxygen concentration is lower than 1 ppm, it is difficult to maintain the oxygen concentration, and thus a control mechanism becomes complicated and the cost increases. In addition, when the oxygen concentration is higher than 2000 ppm, it is difficult for the curing of the ultraviolet curable resin to proceed. Here, "position which is 1 mm above a surface of the coating film" is a position which is separated upwards from the upper surface of the coating film by 1 mm.

Furthermore, the inventor of the present invention has obtained the knowledge that it is necessary to adjust the ratio A/B of the thickness A of the anti-glare layer to the diameter B of the particles in the range of 1.5 to 2.4 to prevent the visual roughness.

When an anti-glare film is manufactured while satisfying the above-described conditions, the visual roughness of the anti-glare layer can be prevented and the productivity can be improved.

In the present invention, it is preferable that the diameter B of the particles is 5 μm to 9 μm. In addition, it is preferable that the thickness A of the anti-glare layer is 10 μm or greater. Furthermore, in the present invention, it is preferable that the difference in index of refraction between the particles and the curable resin is in the range of 0.001 to 0.050, and it is preferable that the thickness of the film substrate is 1 μm to 80 μm.

As described above, according to the anti-glare film manufacturing method of the present invention, the visual roughness of the anti-glare layer can be prevented and the productivity can be improved.

DESCRIPTION OF THE PREFERRED EMBODIMENTS

Hereinafter, preferred embodiments of an anti-glare film manufacturing method according to the present invention will be described in detail in accordance with the accompanying drawings.

Figure 1:
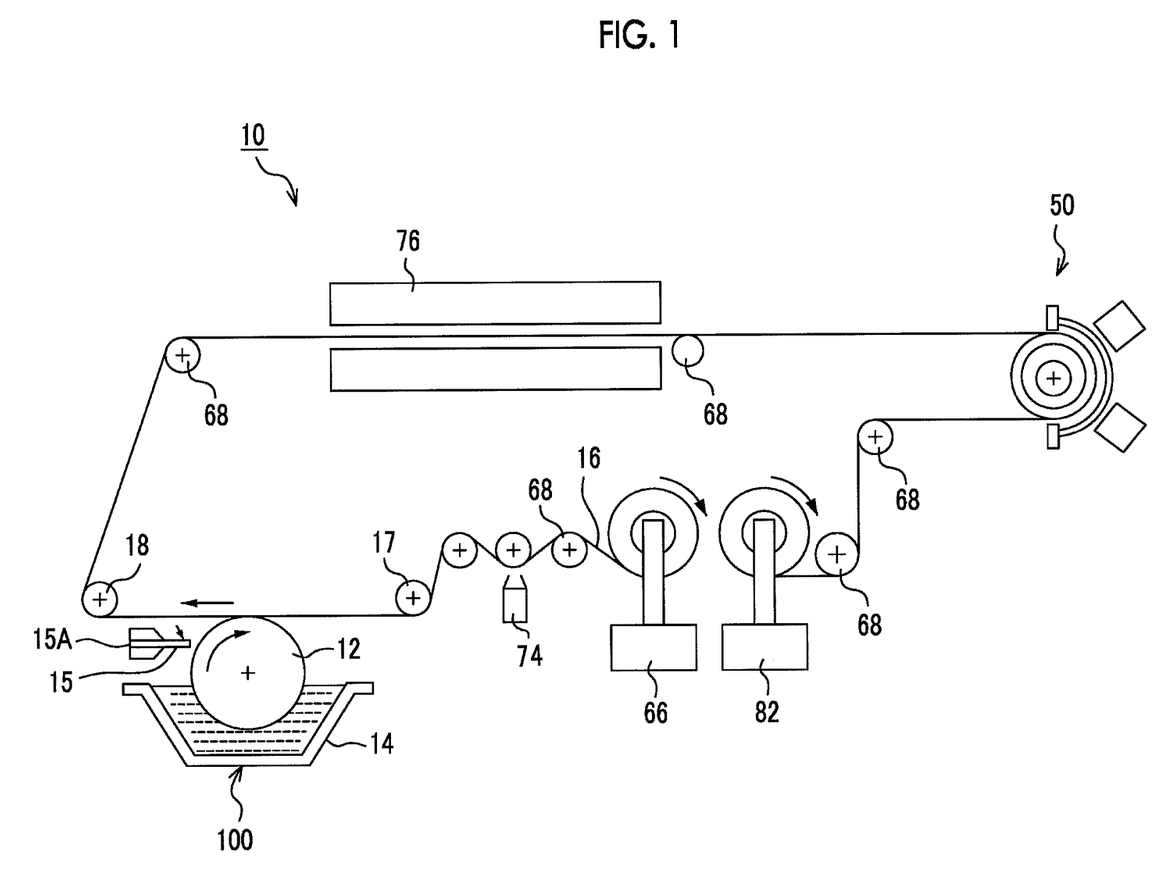
FIG. 1 is a diagram showing the configuration of an optical film manufacturing line to which a device and a method for curing a coating film according to the present invention are applied.
Figure 2:
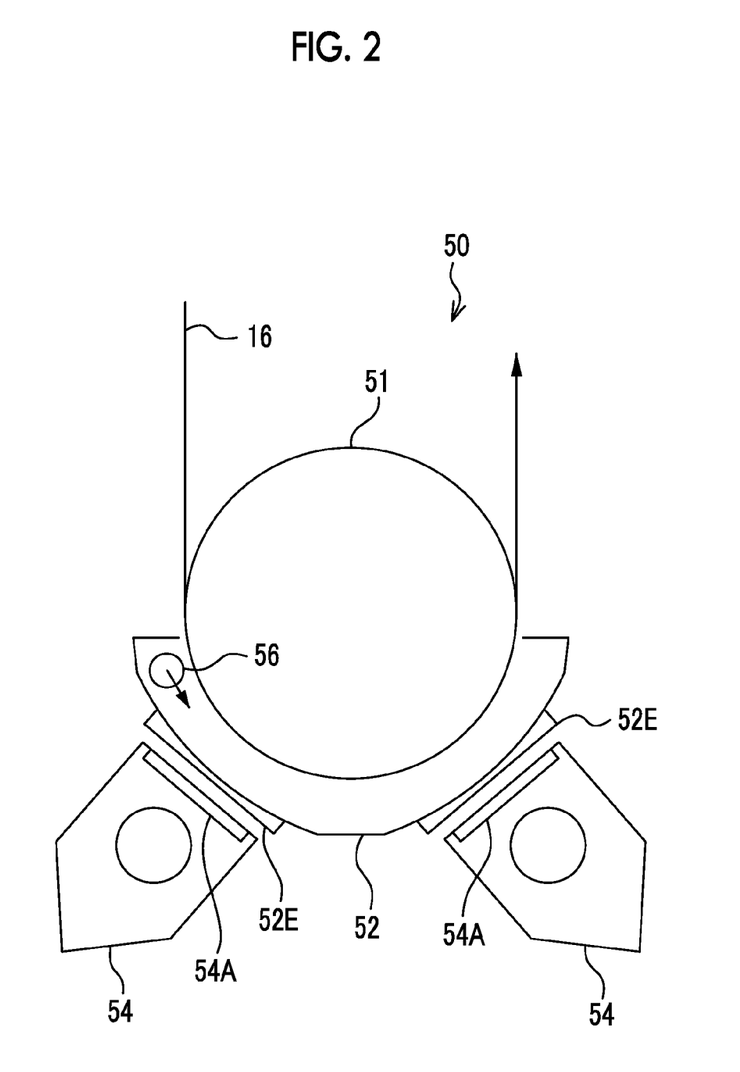
FIG. 2 is a cross-sectional view showing the configuration of the coating film curing device of FIG. 1.

FIG. 1 is a diagram showing the configuration of an optical film manufacturing line to which an anti-glare film manufacturing method according to the present invention is applied. FIG. 2 shows an example of a coating film curing device in the manufacturing line.

As shown in FIG. 1, in an optical film manufacturing line 10, a web 16 which is a transparent support is sent from a sending mechanism 66. The web 16 is guided by guide rollers 68 and fed to a dust catcher 74. The dust catcher 74 can remove the dust adhering on the surface of the web 16.

A gravure coating device 100 is provided in the downstream of the dust collector 74 to apply a coating liquid to the web 16. The gravure coating device 100 will be described later in detail.

A dry zone 76 is provided in the downstream of the gravure coating device 100 to form a coating layer (for example, anti-glare layer) on the web 16. Furthermore, an ultraviolet irradiation device 50 which is a coating film curing device provided with a plurality of active ray irradiation units is provided in the downstream of the dry zone 76 to crosslink the coating layer (for example, anti-glare layer) by ultraviolet irradiation to thereby form a desired polymer. The web 16 having a polymer formed thereon is wound by a winding mechanism 82 provided in the downstream of the ultraviolet irradiation device 50.

The guide rollers 68 are provided to wind and support the web 16 and to be able to transport the web 16 over approximately the entire optical film manufacturing line 10. The guide roller 68 is a freely rotatable roller member, and has a length which is approximately the same as the width of the web 16 (in this embodiment, the length is slightly longer than the width of the web 16).

The gravure coating device 100 is a device which applies, by a rotationally driven gravure roller 12, a coating liquid of a predetermined thickness to the web 16 guided and run by an upstream guide roller 17 and a downstream guide roller 18.

The gravure roller 12, the upstream guide roller 17, and the downstream guide roller 18 have a length which is approximately the same as the width of the web 16. The gravure roller 12 is rotationally driven in the direction shown by the arrow in FIG. 1. The rotation direction is a reverse rotation direction with respect to the running direction of the web 16. Depending on the coating condition, coating with the driving of the gravure roller 12 in a forward rotation direction which is a rotation direction reverse to that in FIG. 1 can also be employed.

The method of driving the gravure roller 12 is, but is not limited to, direct driving (shaft direct connection) in which an inverter motor is directly connected to a shaft. Methods using combinations of various motors and reduction gears (gear heads) and winding transmitting units such as various motors and timing belts can also be used.

The cell on the surface of the gravure roller 12 may have any shape such as a known pyramid shape, a lattice shape, and an oblique line shape. An appropriate cell may be selected in accordance with a coating speed, the viscosity of the coating liquid, the thickness of a coating layer, and the like.

A liquid receiving pan 14 is provided below the gravure roller 12. The liquid receiving pan 14 is filled with the coating liquid. Approximately half the gravure roller 12 is dipped in the coating liquid. Using this configuration, the coating liquid is supplied to the cell on the surface of the gravure roller 12.

In order to scrape a surplus of the coating liquid before coating, a doctor blade 15 is installed so that its tip end is brought into contact with the about 10 o'clock position of the gravure roller 12 (upper left portion of the gravure roller 12 in FIG. 1). The doctor blade 15 is biased by a bias unit (not shown) around a rotation center 15A of a proximal end portion in the arrow direction in FIG. 1.

The upstream guide roller 17 and the downstream guide roller 18 are supported in a state of being approximately parallel to the gravure roller 12. It is preferable that the upstream guide roller 17 and the downstream guide roller 18 have a configuration in which both end portions are rotatably supported by a bearing member (ball bearing and the like) without a driving mechanism attached thereto.

Since the above-described gravure coating device 100 is particularly effective for thin layer coating, it can be appropriately applied to, for example, an optical film manufacturing line which performs ultrathin layer coating in which the wet coating amount is 5 ml/m$^2$ or less (the thickness upon coating is 5 µm or less).

In this embodiment, the gravure coating device 100 may be installed in a clean atmosphere such as a clean room. The cleaning level is preferably class 1000 or lower, more preferably class 100 or lower, and even more preferably class 10 or lower.

In the present invention, the number of coating layers of coating liquids which are simultaneously applied is not limited to one. If necessary, the present invention can also be applied to a simultaneous multilayer coating method.

As the method of applying a coating liquid, other than the above-described gravure coater 100, a bar coater, a roll coater (transfer roll coater, reverse roll coater or the like), a die coater, an extrusion coater, a fountain coater, a curtain coater, a dip coater, a spin coater, a spray coater, a slide hopper, or the like can be employed.

In addition, in the optical functional film manufacturing line shown in FIG. 1, it is preferable that the tension of the web 16 be in the range of 100 to 500 N/m.

Next, the ultraviolet irradiation device 50 according to the present invention will be described. As shown in FIG. 2, the ultraviolet irradiation device 50 is constituted by a backup roller 51 on which the web 16 is wound, a housing 52 which is a casing member (enclosed space forming unit) which forms an enclosed space around the web 16, two ultraviolet lamp houses 54 which irradiate the coating film formed on the surface of the web 16 with ultraviolet rays to cure the coating film, and a nozzle 56 which supplies a nitrogen gas (inert gas) to the enclosed space in the housing 52. In FIG. 2, two ultraviolet lamp houses are provided, but three or more ultraviolet lamp houses may be provided.

In the housing 52, a portion corresponding to an irradiation window 54A (silica glass or the like) of the ultraviolet lamp house 54 is formed using a transparent plate 52E having a high ultraviolet transmission to be able to efficiently irradiate the coating film on the web 16 with ultraviolet rays which are emitted from the ultraviolet lamp house 54. It is preferable that, for example, silica glass be employed as the transparent plate 52E.

The housing 52 is provided to be separated from the ultraviolet lamp houses 54 to avoid an effect of thermal deformation (thermal deformation due to an increase in the temperature during the ultraviolet irradiation) of the ultraviolet lamp houses 54 on the housing 52.

In addition, the housing 52 and the nozzle 56 have a jacket configuration in which cooling water is circulated so as to avoid the thermal deformation due to an increase in the temperature during the ultraviolet irradiation.

The nozzle 56 is a unit which supplies a nitrogen gas to the enclosed space in the housing 52, and is disposed to jet the nitrogen gas supplied by a gas pipe (not shown) in the direction of the arrow in the drawing.

In the housing 52, a probe of an oxygen concentration meter (not shown) is disposed. Using this configuration, the inside of the housing 52 can be made as an enclosed space, and the oxygen concentration can be controlled to a desired value by supplying an inert gas such as a nitrogen gas.

A temperature control unit which controls a surface temperature is provided in the backup roller 51. As a specific configuration of the temperature control unit, a system in which a fluid (water, oil, or the like) of which the temperature is controlled is circulated in the backup roller 51 can be generally employed. In addition, a configuration can also be employed in which the backup roller 51 is used as a dielectric heating roller.

In the present invention, in an anti-glare film manufacturing method which includes: forming a coating film including particles and an ultraviolet curable resin on a film substrate; and curing the ultraviolet curable resin by ultraviolet irradiation to form an anti-glare layer constituted by the particles and the cured resin, the ultraviolet irradiation amount in the ultraviolet irradiation of the first unit is 49 mJ/cm$^2$ or less, the ultraviolet irradiation amount in the ultraviolet irradiation of the second and subsequent units is greater than 50 mJ/cm$^2$, the sum of the ultraviolet irradiation amount in the whole ultraviolet irradiation is 100 mJ/cm$^2$ or greater, the oxygen concentration at a position which is 1 mm above a surface of the coating film in the ultraviolet irradiation is 2000 ppm or lower, and the ultraviolet irradiation of the first unit is performed above a roller having a surface temperature of 10° C. to 24° C. Furthermore, the ratio A/B of the thickness A of the anti-glare layer to the diameter B of the particles is adjusted in the range of 1.5 to 2.4.

The anti-glare layer of the anti-glare film is formed of an ultraviolet curable resin including particles, but has a problem in that the surface of the anti-glare layer roughens at random times due to the instability in aggregation of the particles. The surface roughness can be visually confirmed as roughness. There has been obtained knowledge that in order to solve the problem, it is desirable that the ultraviolet irradiation be performed in a divided manner with two or more ultraviolet irradiation units, the ultraviolet irradiation amount in the ultraviolet irradiation of the first unit is 49 mJ/cm$^2$ or less, the ultraviolet irradiation amount in the ultraviolet irradiation of the second and subsequent units is greater than 50 mJ/cm$^2$, and the total ultraviolet irradiation amount in the whole ultraviolet irradiation is 100 mJ/cm$^2$ or greater.

In addition, knowledge has been obtained that the temperature condition in the ultraviolet irradiation of the first unit in which the curing of the ultraviolet curable resin starts is also important and it is desirable that the ultraviolet irradiation of the first unit be performed above a roller having a surface temperature of 10° C. to 24° C. When the surface temperature of the roller is higher than 24° C., the viscosity of the ultraviolet curable resin is excessively reduced, and thus the particles flow easily and the particles are strongly aggregated, whereby the surface of the anti-glare layer roughens. On the other hand, when the surface temperature of the roller is lower than 10° C., it is difficult for the curing of the ultraviolet curable resin to proceed, and thus the particles are aggregated.

Furthermore, it is also necessary to adjust the oxygen concentration at a position which is 1 mm above a surface of the coating film in the ultraviolet irradiation to 2000 ppm or lower. When the oxygen concentration is higher than 2000 ppm, it is difficult for the curing of the ultraviolet curable resin to proceed.

Furthermore, the inventor of the present invention has obtained the knowledge that it is necessary to adjust a ratio A/B of a thickness A of the anti-glare layer to a diameter B of the particles in the range of 1.5 to 2.4 to prevent the visual roughness.

When an anti-glare film is manufactured while satisfying the above-described conditions, the visual roughness of the anti-glare layer can be prevented and the productivity can be improved.

In the present invention, it is preferable that the diameter B of the particles be 5 μm to 9 μm. In addition, it is preferable that the thickness A of the anti-glare layer be 10 μm or greater. Furthermore, in the present invention, it is preferable that the difference in index of refraction between the particles and the ultraviolet curable resin after curing be in the range of 0.001 to 0.050, and it is preferable that a thickness of the film substrate be 80 μm or less. It is preferable that the difference in index of refraction between the binder of the anti-glare layer (ultraviolet curable resin after curing) and the anti-glare particles be 0.050 or less in reducing the internal scattering in the anti-glare layer.

The index of refraction of the material (binder portion) which forms the anti-glare layer is preferably in the range of 1.57 to 2.00, and more preferably in the range of 1.60 to 1.80. The index of refraction of triacetylcellulose (TAC), which is preferably used as the substrate, is 1.48. The index of refraction of the binder, which forms the anti-glare layer, is in the range of 1.57 to 2.00, but the anti-reflection property is reduced when the index is too low or too high.

Regarding the substrate which is used as the web 16, a preferred substrate is selected depending on the intended use, and specifically, a transparent support is used. It is preferable that a plastic film is used as the transparent support.

Examples of the polymer which forms the plastic film include cellulosic esters (such as triacetylcellulose and diacetylcellulose), polyamides, polycarbonates, polyesters (such as polyethylene telephthalate and polyethylene naphthalate), polystyrenes, polyolefins, and the like.

Among them, it is preferable that triacetylcellulose (TAC) is used. When an anti-glare film is used in a liquid crystal display device, an adhesive layer is provided on one surface of the anti-glare film, and then the anti-glare film is disposed on the outermost surface of the display. Triacetylcellulose is used in a protective film which protects a polarizing layer of a polarizing plate. Accordingly, it is preferable that the anti-glare film be used as is in the protective film for the cost.

The compound for use in the binder is preferably a polymer having saturated hydrocarbon or polyether as a main chain, and more preferably a polymer having saturated hydrocarbon as a main chain. It is preferable that the binder polymer be crosslinked. It is preferable that the polymer having saturated hydrocarbon as a main chain be obtained by a polymerization reaction of an ethylenically unsaturated monomer. It is preferable that a monomer having two or more ethylenically unsaturated groups be used in order to obtain a crosslinked binder polymer.

Examples of the monomer having two or more ethylenically unsaturated groups include esters of polyhydric alcohol and (meth)acrylic acid (such as ethylene glycol di(meth)acrylate, 1,4-cyclohexane diacrylate, pentaerythritol tetra(meth)acrylate, pentaerythritol tri(meth)acryl ate, trimethylolpropane tri(meth)acrylate, trimethylolethane tri(meth)acrylate, dipentaerythritol tetra(meth)acrylate, dipentaerythritol penta (meth)acrylate, dipentaerythritol hexa(meth)acrylate, 1,2,3-cyclohexane tetramethacrylate, polyurethane polyacrylate and polyester polyacrylate), vinylbenzene and derivatives thereof (such as 1,4-divinylbenzene, 4-vinylbenzoic acid-2-acryloylethyl ester and 1,4-divinylcyclohexanone), vinyl sulfones (such as divinyl sulfone), acrylamides (such as methylenebisacrylamide) and methacrylamides.

It is preferable that the polymer having polyether as a main chain be synthesized by a ring-opening polymerization reaction of a multifunctional epoxy compound. The monomer having the ethylenically unsaturated groups is required to be cured by a polymerization reaction by ionizing radiation, heat or the like after being applied. The curing can be performed by a known method using a photopolymerization initiator, a photosensitizer and the like as necessary.

A crosslinked structure may be introduced into the binder polymer by a reaction of a crosslinkable group in place of or in addition to the monomer having two or more ethylenically unsaturated groups. Examples of the crosslinkable functional group include an isocyanate group, an epoxy group, an aziridine group, an oxazoline group, an aldehyde group, a carbonyl group, a hydrazine group, a carboxyl group, a methylol group, and an active methylene group. Vinylsulfonic acid, acid anhydrides, cyanoacrylate derivatives, melamine, etherified methylols, esters and urethanes, and metal alkoxides such as tetramethoxysilane can also be used as monomers for introduction of cross-linked structures.

A functional group exhibiting a crosslinking property as a result of a decomposition reaction, such as a blocked isocyanate group, may also be used. In addition, the crosslinkable group is not limited to the above-described compounds, and may exhibit reactivity as a result of decomposition of the functional group. A compound having the crosslinkable groups is required to be crosslinked by heat or the like after being applied.

In the anti-glare layer, in addition to the material which forms the binder, anti-glare particles of a resin or an inorganic compound are used for the purpose of providing an anti-glare property, preventing a reduction in reflectance due to interference of the binder and preventing color unevenness. It is preferable that the anti-glare particles having a particle diameter smaller than the binder film thickness of the anti-glare layer be less than 50% of the total anti-glare particles in terms of the weight ratio.

The amount of the anti-glare particles applied is preferably in the range of 10 to 1000 mg/m$^2$, and more preferably in the range of 30 to 100 mg/m$^2$. The particle size distribution can be measured by a Coulter Counter method, a centrifugal sedimentation method or the like. However, the distribution is considered in terms of the particle number distribution.

EXAMPLES

Using the optical film manufacturing line 10 shown in FIG. 1 and the ultraviolet irradiation device 50 shown in FIG. 2, application and curing of a coating liquid was performed, and evaluation was performed.

The following liquid was used as a coating liquid.
Composition of Coating Liquid A-1 for Anti-glare Layer

| | |
|---|---|
| PET-30 | 29.2 g |
| Irgacure 127 | 1.6 g |
| Dispersion of 8 μm-Crosslinked Acrylic Styrene Particles a (30%) | 5.4 g |
| Dispersion of 8 μm-Crosslinked Acrylic Particles b (30%) | 3.2 g |
| SP-13 | 17.5 g |
| CAB-531-1 | 0.7 g |
| MIBK | 24.9 g |
| MEK | 17.3 g |

The above coating liquid for an anti-glare layer was filtered by a filter made of polypropylene and having a pore diameter of 30 μm to prepare a coating liquid.

Here, the index of refraction of a film of a light diffusion layer excluding the translucent particles was measured directly by Abbe's refractometer.

The indices of refraction of the particles were as follows.

| | |
|---|---|
| 8 μm-Crosslinked Acrylic Styrene Particles a | 1.555 |
| 8 μm-Crosslinked Acrylic Particles b | 1.500 |

The compounds used were as follows.

PET-30: Mixture of Pentaerythritol Triacrylate and Pentaerythritol tetraacrylate [produced by Nippon Kayaku Co., Ltd.]

DHPA: Mixture of Dipentaerythritol Pentaacrylate and Dipentaerythritol Hexaacrylate [produced by Nippon Kayaku Co., Ltd.]

Dispersion of 8 μm-Crosslinked Acrylic Styrene Particles a (30%): MIBK Dispersion of 8 μm-Crosslinked Acrylic Styrene Particles a (index of refraction 1.555, particle diameter 8.0 μm) [produced by Sekisui Plastics Co., Ltd.] Dispersed with Polytron Dispersing Machine at 10000 rpm for 20 minutes (content of particles 30%)

Dispersion of 8 μm-Crosslinked Acrylic Particles b (30%): M1BK Dispersion of 8 μm-Crosslinked Acrylic Particles b (index of refraction 1.500, particle diameter 8.0 μm) [produced by The Soken Chemical & Engineering Co., Ltd.] Dispersed with Polytron Dispersing Machine at 10000 rpm for 20 minutes Irgacure 127: Polymerization Initiator [produced by Ciba Speciality Chemicals Co., Ltd.]

CAB-531-1: Cellulose Acetate Butyrate [produced by Eastman Chemical Company]

Fluorine-Containing Polymer Containing Ethylenically Unsaturated Group (A-1): Fluorine Polymer (A-1) Described in JP-2005-89536A, Manufacturing Example 3

SP-13: Fluorine Surfactant (used after dissolving as a 10 mass % MEK solution)

[Chem. 1]

SP-13
MW 14000

Test 1

Anti-Glare Layer Coating

A triacetyl cellulose film (TAC-TD80U, manufactured by Fuji Film Corporation.) having a thickness of 80 μm was unwound from a roll. The test evaluation was performed with the surface temperature of the backup roller 51, UV irradiation amount, and oxygen concentration shown in Table 1 of FIG. 3A. In Comparative Example 1, the curing was performed only by the irradiation by the first unit without the irradiation by the second unit. The thicknesses of the respective anti-glare layers were adjusted to be 13 μm by adjusting the coating amount (that is, ratio A/B of thickness A of anti-glare layer to diameter B of particles=1.63).

As an oxygen concentration meter, a zirconia sensor (minimum range: 0 to 1 ppm, measurement accuracy: ±2%) was used. The oxygen concentration measurement position was on the differential pressure measurement port side below the housing 52.

Saponification Treatment of Optical Film

The sample was subjected to the following treatment after coating. 1.5 mol/L of an aqueous sodium hydroxide solution was prepared and maintained at 55° C. 0.01 mol/L of an aqueous dilute sulfuric acid solution was prepared and maintained at 35° C. The optical film manufactured was dipped in the aqueous sodium hydroxide solution for 2 minutes and then dipped in water, and the aqueous sodium hydroxide solution was sufficiently washed. Subsequently, the film was dipped in the aqueous dilute sulfuric acid solution for 1 minute and then dipped in water, and the aqueous dilute sulfuric acid solution was sufficiently washed. Finally, the sample was sufficiently dried at 120° C.

In this manner, an optical film subjected to the saponification treatment was manufactured.

Manufacturing of Polarizing Plate

A polarizing film was manufactured by adsorption of iodine onto polyvinyl alcohol and stretching. Both surfaces of the polarizing film were adhered to a triacetyl cellulose film (TAC-TD80U, manufactured by Fuji Film Corporation) having a thickness of 80 μm dipped in 1.5 mol/L of an NaOH aqueous solution at 55° C. for 2 minutes, neutralized and washed, and to each of the film samples subjected to the saponification treatment in Example 1, and were protected, whereby a polarizing plate was manufactured.

Evaluation of Optical Film and Polarizing Plate

The obtained optical film samples and polarizing plate samples were evaluated as to the following items. The results are shown in Table 1.

Surface Roughness (Ra):

Centerline average roughness (Ra) (μm) was measured according to JIS-B0601 (1982) by using SJ-400 (manufactured by Mitutoyo Corporation). The measurement was performed under measurement conditions of an evaluation length of 2.5 mm, a cutoff of 0.25 mm, a speed of 0.5 mm/s, a probe diameter of 2 μm, and a load of 30 μN.

Roughness of Surface:

Black and white color unevenness in the transport direction shown by reflection when the light of a three band fluorescent lamp had been reflected in a dark room was visually evaluated with the following standards.

A: The anti-glare property is uniformly exhibited and roughness cannot be seen.

B: The anti-glare property is uniformly exhibited, but slight roughness can be seen.

C: Roughness can be seen over the entire surface.

D: Roughness can be seen over the entire surface as though sand were spread on the surface.

Pencil Hardness Evaluation:

As an index for scratch resistance, the pencil hardness evaluation described in JIS K 5400 was performed. A light diffusion film was subjected to moisture conditioning at a temperature of 25° C. and a humidity of 60% RH for 2 hours, and the evaluation was then performed with the following determination under a load of 4.9 N by using 2H pencil for test prescribed in JIS S 6006. The highest hardness when rated "OK" was used as the evaluation value.

From 0 to 1 scratch in the evaluation of n=5: A 3 or fewer scratches in the evaluation of n=5: B 3 or more scratches in the evaluation of n=5: C Adhesion:

Vertical 11 cuts and horizontal 11 cuts were made into a grid shape by a cutter knife on a surface on the anti-glare layer side of each sample to make total 100 squares. After a weather resistance test for 340 hours using a sunshine weather meter (manufactured by Suga Test Instruments Co., Ltd., carbon arc lamp, under conditions of a black panel temperature of 83° C. with rain), the evaluation was performed with the following standards.

An anti-reflective film sample was subjected to moisture conditioning at a temperature of 25° C. and a humidity of 60% RH for 2 hours. Vertical 11 cuts and horizontal 11 cuts were made into a grid shape by a cutter knife on a surface on the anti-glare layer side of each sample to make total 100 squares, and to the surface, a polyester adhesive tape (No. 31B) manufactured by Nitto Denko Corporation was adhered. After lapse of 30 minutes, the tape was rapidly peeled off, and the number of peeled-off squares was counted to perform the evaluation with the following 4-stage standards. The same adhesion evaluation was performed three times and an average thereof was obtained.

A: The peeling of 1 to 2 squares was confirmed in the 100 squares.

B: The peeling of 3 to 10 squares was confirmed in the 100 squares.

C: The peeling of 11 or more squares was confirmed in the 100 squares.

Figure 3A:
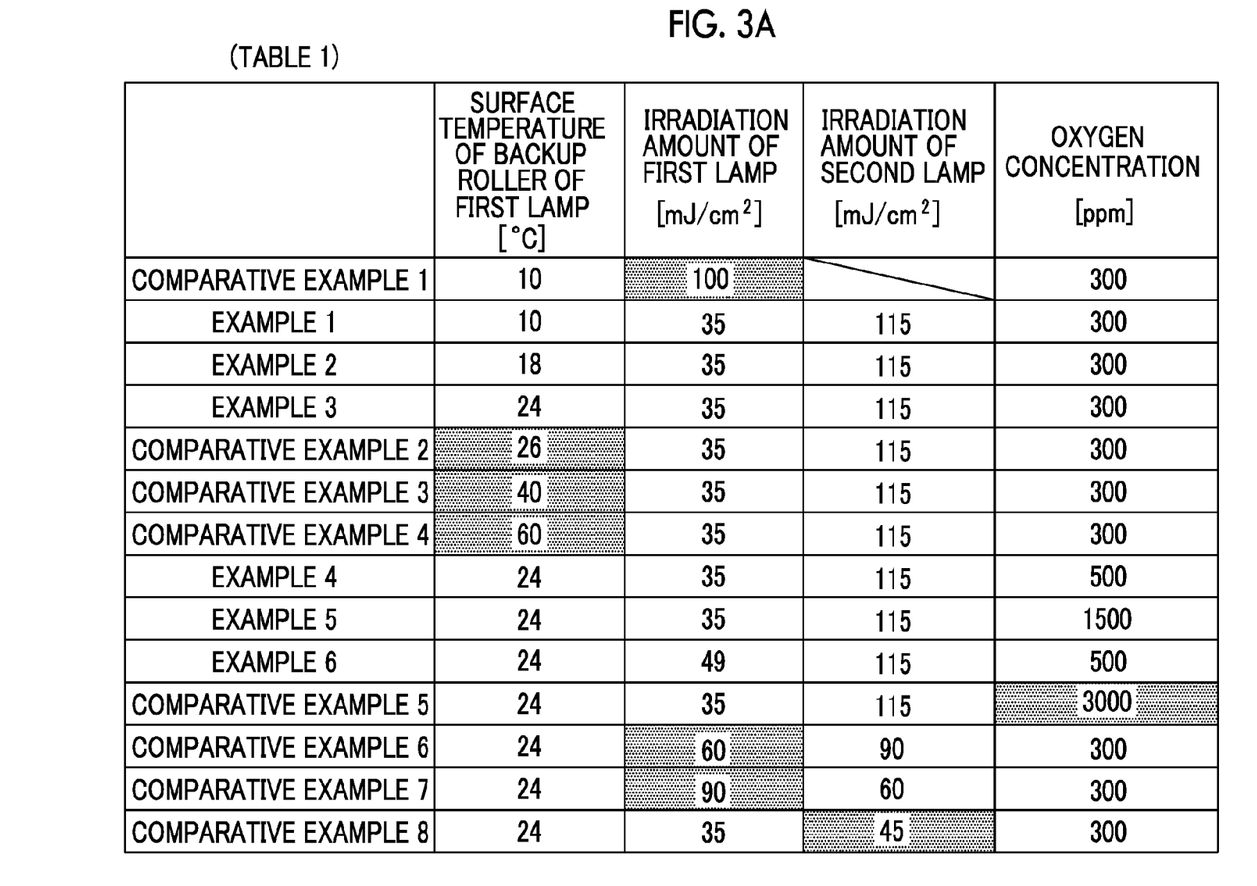
FIGS. 3A and 3B are tables showing Examples (Test 1) showing the effect of the present invention.
Figure 3B:
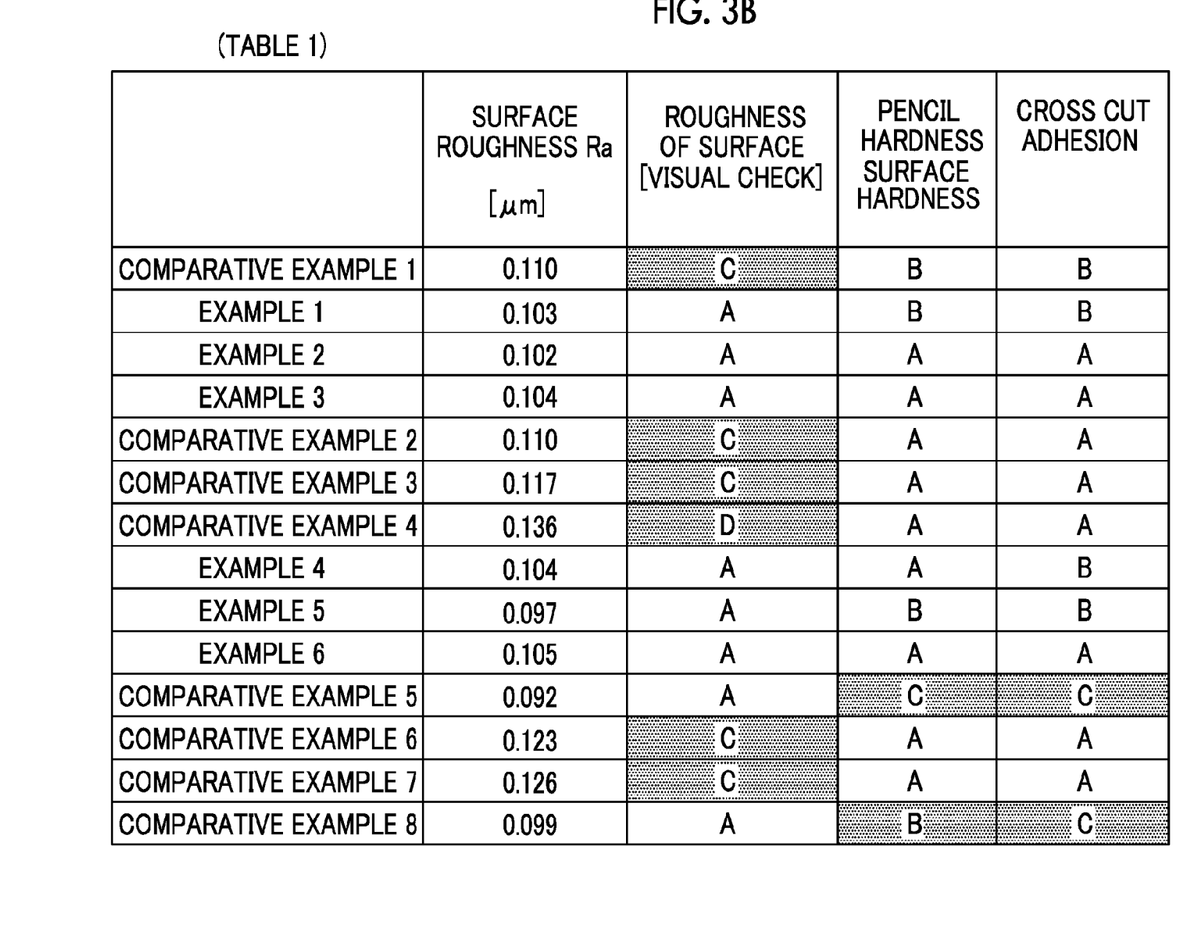

The evaluation results of the samples are shown in Table 1 of FIG. 3B.

From the test results, it is found that it is desirable that the ultraviolet irradiation amount in the ultraviolet irradiation of the first unit be 49 mJ/cm$^2$ or less, the ultraviolet irradiation amount in the ultraviolet irradiation of the second and subsequent units be greater than 50 mJ/cm$^2$, the total ultraviolet irradiation amount in the whole ultraviolet irradiation be 100 mJ/cm$^2$ or greater, the oxygen concentration at a position 1 mm above the surface of the film, the ultraviolet irradiation be 2000 ppm or lower, and the ultraviolet irradiation of the first unit be performed above a roller having a surface temperature of 10° C. to 24° C.

Test 2

Figure 4:
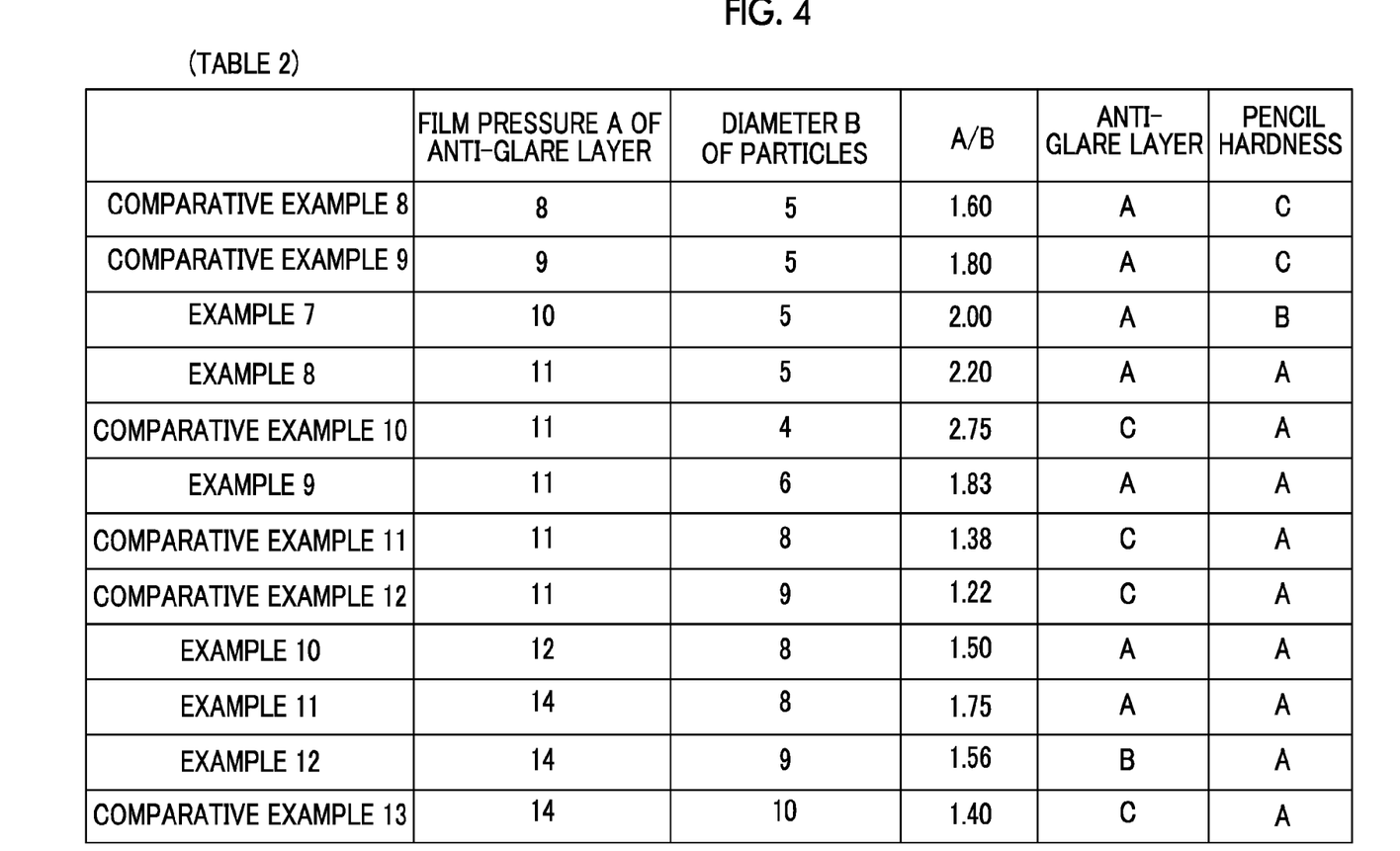
FIG. 4 is a table showing Examples (Test 2) showing the effect of the present invention.

A sample was made in the same manner as in Test 1 with a thickness A of the anti-glare layer and a diameter B of the particles shown in Table 2 of FIG. 4 under conditions of a surface temperature of the backup roller 51, an UV irradiation amount, and an oxygen concentration of Example 3 of Table 1 of FIG. 3A.

Evaluation of Optical Film and Polarizing Plate

The obtained optical film samples and polarizing plate samples were evaluated as to the following items. The results are shown in Table 2.

Pencil Hardness Evaluation:

As an index for scratch resistance, the pencil hardness evaluation described in JIS K 5400 was performed. A light diffusion film was subjected to moisture conditioning at a temperature of 25° C. and a humidity of 60% RH for 2 hours, and the evaluation was then performed with the following determination under a load of 4.9 N by using 2H pencil for test prescribed in JIS S 6006. The highest hardness when rated "OK" was used as the evaluation value.

From 0 to 1 scratch in the evaluation of n=5: A 3 or fewer scratches in the evaluation of n=5: B 3 or more scratches in the evaluation of n=5: C Anti-Glare Property:

The entire rear side of the coating surface of an obtained optical film sample was filled with black magic ink, and the extent of blur of the reflected image of a case in which a bare fluorescent lamp (8000 cd/m2) without louver was mirrored from an angle of 5 degrees and observed from a direction of −5 degrees and a case in which the lamp was projected from a degree of 45 degrees and observed from a direction of −45 degrees was evaluated in accordance with the following standards.

A: The outline of the fluorescent lamp was slightly observed at −5 degrees, but was relatively clearly recognized at −45 degrees.

B: The outline of the fluorescent lamp was relatively clearly recognized at −5 degrees and also at −45 degrees.

C: The outline of the fluorescent lamp was clearly shown or glared at −5 degrees and also at −45 degrees.

From the test results, it is found that it is desirable that the ratio A/B of the thickness A of the anti-glare layer to the diameter B of the particles be in the range of 1.5 to 2.4. In addition, it is found that it is preferable that the diameter B of the particles be 5 μm to 9 μm, and the thickness A of the anti-glare layer be 10 μm or greater.

What is claimed is:

1. An anti-glare film manufacturing method comprising:
   forming a coating film including particles and an ultraviolet curable resin on a film substrate; and
   curing the ultraviolet curable resin by ultraviolet irradiation to form an anti-glare layer constituted by the particles and the ultraviolet curable resin,
   wherein a ratio A/B of a thickness A of the anti-glare layer to a diameter B of the particles is in the range of 1.5 to 2.4,
   wherein the ultraviolet irradiation of the ultraviolet curable resin in the coating film is performed in a divided manner with two or more ultraviolet irradiation units being performed consecutively, the ultraviolet irradiation amount in the ultraviolet irradiation of the first unit is 49 mJ/cm$^2$ or less, the ultraviolet irradiation amount in the ultraviolet irradiation of the second and subsequent units is greater than 50 mJ/cm$^2$, and the total ultraviolet irradiation amount in the whole ultraviolet irradiation is 100 mJ/cm$^2$ or greater,
   wherein the oxygen concentration at a position which is 1 mm above a surface of the coating film in the ultraviolet irradiation is 1 ppm to 2000 ppm, and
   wherein the ultraviolet irradiation of the first unit is performed above a roller having a surface temperature of 10° C. to 24° C.

2. The anti-glare film manufacturing method according to claim 1, wherein the diameter B of the particles is 5 μm to 9 μm.

3. The anti-glare film manufacturing method according to claim 1, wherein the thickness A of the anti-glare layer is 10 μm or greater.

4. The anti-glare film manufacturing method according to claim 2, wherein the thickness A of the anti-glare layer is 10 μm or greater.

5. The anti-glare film manufacturing method according to claim 1, wherein a difference in index of refraction between the particles and the curable resin is in the range of 0.001 to 0.050.

6. The anti-glare film manufacturing method according to claim 2, wherein a difference in index of refraction between the particles and the curable resin is in the range of 0.001 to 0.050.

7. The anti-glare film manufacturing method according to claim 3, wherein a difference in index of refraction between the particles and the curable resin is in the range of 0.001 to 0.050.

8. The anti-glare film manufacturing method according to claim 1, wherein a thickness of the film substrate is 1 μm to 80 μm.

9. The anti-glare film manufacturing method according to claim 2, wherein a thickness of the film substrate is 1 µm to 80 µm.

10. The anti-glare film manufacturing method according to claim 3, wherein a thickness of the film substrate is 1 µm to 80 µm.

11. The anti-glare film manufacturing method according to claim 4, wherein a thickness of the film substrate is 1 µm to 80 µm.

12. The anti-glare film manufacturing method according to claim 1, wherein the curing of the ultraviolet curable resin contained in the coating film is completed by ultraviolet irradiation with the second or subsequent units.

* * * * *